US009313529B2

(12) United States Patent
Nilsson et al.

(10) Patent No.: US 9,313,529 B2
(45) Date of Patent: Apr. 12, 2016

(54) VIDEO STREAMING

(75) Inventors: Michael Erling Nilsson, Ipswich (GB); Rory Stewart Turnbull, Woodbridge (GB); Ian Barry Crabtree, Ipswich (GB); Stephen Clifford Appleby, Colchester (GB)

(73) Assignee: British Telecommunications PLC, London (GB)

( * ) Notice: Subject to any disclaimer, the term of this patent is extended or adjusted under 35 U.S.C. 154(b) by 452 days.

(21) Appl. No.: 13/820,277

(22) PCT Filed: Sep. 2, 2011

(86) PCT No.: PCT/GB2011/001296
§ 371 (c)(1),
(2), (4) Date: Mar. 1, 2013

(87) PCT Pub. No.: WO2012/028856
PCT Pub. Date: Mar. 8, 2012

(65) Prior Publication Data
US 2013/0163667 A1    Jun. 27, 2013

(30) Foreign Application Priority Data

Sep. 2, 2010    (EP) .................................... 10251540

(51) Int. Cl.
*H04N 21/234*    (2011.01)
*H04N 21/647*    (2011.01)
(Continued)

(52) U.S. Cl.
CPC ... *H04N 21/23406* (2013.01); *H04N 19/00575* (2013.01); *H04N 21/23424* (2013.01);
(Continued)

(58) Field of Classification Search
CPC .................. H04N 21/23424; H04N 21/44016; H04N 21/23439; H04N 21/4307; H04L 65/60
USPC .......................................................... 709/231
See application file for complete search history.

(56) References Cited

U.S. PATENT DOCUMENTS

2004/0049793 A1    3/2004    Chou
2005/0015246 A1    1/2005    Thumpudi et al.
(Continued)

FOREIGN PATENT DOCUMENTS

EP    1 298 931    4/2003
EP    1 395 000    3/2004
(Continued)

OTHER PUBLICATIONS

International Search Report for PCT/GB2011/001296, mailed Oct. 31, 2011.
(Continued)

*Primary Examiner* — Douglas Blair
*Assistant Examiner* — Christopher Cadorna
(74) *Attorney, Agent, or Firm* — Nixon & Vanderhye PC

(57) ABSTRACT

One or more network based video servers is/are connected to one or more video receivers over a shared network. Pieces of video content are each encoded at a number of constant quality levels and stored on one or more of the network based servers. Responsive to requests from a receiver, video content is selected on a server and delivered over the shared network to the receiver. The system selects the quality level of the stream to deliver based on characteristics of the video stream currently being delivered, and the number of bits already buffered at the video receiver and the available network throughput. The aim is to select the video quality being delivered according to the available network throughput to maximize quality while ensuring that video data is delivered over the network in time to be decoded and displayed without interruption. Certain exemplary embodiments make that selection in advance.

24 Claims, 14 Drawing Sheets

(51) Int. Cl.
*H04N 19/503* (2014.01)
*H04N 21/2343* (2011.01)
*H04N 21/24* (2011.01)
*H04N 21/44* (2011.01)
*H04N 21/6377* (2011.01)
*H04N 21/845* (2011.01)

(52) U.S. Cl.
CPC ..... *H04N21/23439* (2013.01); *H04N 21/2401* (2013.01); *H04N 21/2402* (2013.01); *H04N 21/44004* (2013.01); *H04N 21/44016* (2013.01); *H04N 21/6377* (2013.01); *H04N 21/647* (2013.01); *H04N 21/845* (2013.01)

(56) References Cited

U.S. PATENT DOCUMENTS

| | | |
|---|---|---|
| 2005/0201485 A1 | 9/2005 | Fay |
| 2006/0045180 A1 | 3/2006 | Ghanbari et al. |
| 2006/0075446 A1 | 4/2006 | Klemets et al. |
| 2006/0095401 A1 | 5/2006 | Krikorian et al. |
| 2008/0209490 A1 | 8/2008 | Dankworth et al. |
| 2010/0146145 A1 | 6/2010 | Tippin et al. |
| 2011/0066673 A1 | 3/2011 | Outlaw |
| 2013/0111060 A1 | 5/2013 | Nilsson et al. |

FOREIGN PATENT DOCUMENTS

| | | |
|---|---|---|
| EP | 1 641 271 | 3/2006 |
| WO | WO 00/35201 | 6/2000 |
| WO | WO 03/084172 | 10/2003 |
| WO | 2004/047455 | 6/2004 |
| WO | 2005/093995 | 10/2005 |
| WO | 2008/119954 | 10/2008 |
| WO | 2009/112801 | 9/2009 |
| WO | 2010/067050 | 6/2010 |

OTHER PUBLICATIONS

Walker, M.D. et al., "Mobile Video-Streaming", BT Technology Journal, vol. 21, No. 3, (Jul. 1, 2003), pp. 192-202.

Crabtree, B. et al., "Equitable quality video streaming", BT Group Chief Technology Office, BT, Ipswich, UK, 2009 IEEE Crown (6 pgs.).

Alam, Farhad et al., "Multiple Bitstream Switching for Video Streaming in Monotonically Decreasing Rate Schedulers", Department of Electronics Engineering, Aligarh Muslim University, Aligarh, UP, India and Department of Electronic Systems Engineering, University of Essex, Colchester, UK, 2006 IEEE (6 pgs.).

Nilsson, Mike et al., "Equitable quality video streaming for IP networks", BT Innovate, Ipswich, UK, 2009 Inderscierice Enterprises Ltd. (12 pgs.).

Notice of Allowance dated Jan. 20, 2015 issued in corresponding Application No. 13/807,868 (14 pages).

| GoP g | Quality $L_q = 2.7$ | | | | | Quality $L_q = 3.7$ | | | | |
|---|---|---|---|---|---|---|---|---|---|---|
| | Pre-load in milliseconds for rates given by $C_r$ | | | | Rate required with no pre-load, $D_{qg}$ | Pre-load in milliseconds for rates given by $C_r$ | | | | Rate required with no pre-load, $D_{qg}$ |
| | $C_r = 0.6$ | $C_r = 0.8$ | $C_r = 1.0$ | $C_r = 1.2$ | | $C_r = 0.6$ | $C_r = 0.8$ | $C_r = 1.0$ | $C_r = 1.2$ | |
| 1 | 2376376 | 901374 | 12970 | 602 | 374 | 2375295 | 893471 | 10958 | 0 | 773 |
| 2 | 2375612 | 901039 | 12897 | 823 | 377 | 2374633 | 893215 | 10944 | 0 | 780 |
| 3 | 2374772 | 900646 | 12778 | 1010 | 380 | 2373787 | 892821 | 10821 | 0 | 785 |
| 4 | 2373761 | 900126 | 12558 | 1125 | 403 | 2372847 | 892356 | 10641 | 52 | 841 |
| 5 | 2372261 | 899238 | 12043 | 1030 | 381 | 2371447 | 891546 | 10185 | 0 | 787 |
| 6 | 2371211 | 898688 | 11799 | 1127 | 384 | 2370475 | 891056 | 9986 | 0 | 790 |
| 7 | 2370076 | 898074 | 11504 | 1189 | 386 | 2369404 | 890493 | 9727 | 3 | 799 |
| 8 | 2368763 | 897327 | 11101 | 1174 | 387 | 2368198 | 889829 | 9387 | 34 | 808 |
| 9 | 2367443 | 896574 | 10695 | 1156 | 389 | 2366917 | 889108 | 9003 | 34 | 817 |
| 10 | 2366031 | 895752 | 10233 | 1098 | 388 | 2365586 | 888349 | 8588 | 12 | 808 |

Figure 6

VIDEO STREAMING

This application is the U.S. national phase of International Application No. PCT/GB2011/001296, filed 2 Sep. 2011, which designated the U.S. and claims priority to EP Application No. 10251540.0, filed 2 Sep. 2010, the entire contents of each of which are hereby incorporated by reference.

TECHNICAL FIELD

This invention in certain exemplary embodiments relates to video streaming, in particular where the streaming is over a network with a non-deterministic bandwidth availability. It is particularly, though not exclusively, applicable to the delivery of video that has been encoded at a number of different constant quality levels.

BACKGROUND AND SUMMARY

Traditionally a video on demand service, such as the applicant's BT Vision service, is supported by encoding video at a constant bit rate and delivering it over a network at the same constant bit rate. This generally requires bandwidth reservation on the network, which can be expensive to provide.

Video encoded using compression techniques naturally has variable bit rate, as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality. When constant bit rate encoding is used, video has to be coded at time varying quality to meet the bit rate constraint. This has been shown to be sub-optimal to the user, who would prefer to see constant quality. Also, by fixing the bit rate independent of the genre of the video content, some genres of content can be encoded well, such as news and drama, whereas others, such as fast moving sport and music videos and concerts, can only be coded quite poorly. Adaptive video delivery using variable bit rate encoding can be used to overcome these problems.

With an adaptive delivery system, the need for bandwidth reservation is removed, with the video delivery system adapting the bit rate of video delivered according to the available network throughput. Content can be encoded at a number bit rates corresponding to a number of quality levels, and delivered over the network without bandwidth reservation. Generally the video data would be delivered as fast as possible, while the quality level (encoded bit rate) is adapted according to the network throughput achieved so as to maximize the quality of the video delivered while ensuring that all video data is delivered over the network in time for it to be decoded and displayed without interruption.

International patent application WO 2009/112801 describes a variable bit rate encoding method that maintains a constant perceptual quality. Use is made of a perceptual quality metric (one that achieves a good correlation with actual viewer perception by taking into account masking effects) in a video encoder to encode with constant perceptual quality. Coding parameters, specifically the quantization parameter, is set separately for each frame taking into account masking effects based on relative contrast levels in each frame. The resulting encoded bitstream has a variable bit rate.

International patent application WO 2005/093995 describes a network with a video server connected to a number of client devices over a shared backhaul. Video content is encoded at a number of constant quality levels and the encoded bitstreams stored on a network based server. In response to requests from the clients, the encoded bitstreams are selected by the server and delivered over the shared network to the clients. Switching between the different bitstreams, and hence qualities, can be done depending on the actual network throughput, with an aim to maximize the quality of the stream.

However, when delivering video content that has been encoded at two or more quality levels, it is necessary to determine the minimum bit rate required to deliver the remainder of the video content at each of the available quality levels, so that a decision can be made as to whether to switch to a different quality bitstream depending on the actual network delivery rate.

One way to determine the minimum delivery bit rate for a given video stream is to analyze the statistics of the encoded video streams prior to commencing delivery. Thus, for a plurality of positions within each video stream, pairs of data can be pre-calculated, each pair containing a delivery bit rate and the minimum start-up delay that would be required if that delivery rate were to be used for timely delivery of the remainder of the given video stream. This data is then used during the subsequent streaming process to determine whether a switch can be made to a different quality stream, based on the amount of data already buffered at the receiver and the actual network delivery rate. Preferably, the quality of the stream selected is as high as the network delivery rate can support.

It is the aim of embodiments of the present invention to provide an improved method of streaming a video sequence over a network. In particular where the video sequence is encoded at a number of different quality levels, and embodiments of the present invention aim to provide an improved method of determining when a switch can be made to a particular quality level of video sequence to switch to, while ensuring timely delivery of the video sequence.

According to one aspect of the present invention, there is provided a method of transmitting a media sequence from a server to a receiver over a transmission link in a network, comprising:
  (a) encoding a media sequence at a first and a second quality levels to generate a respective first encoded sequence and second encoded sequence, wherein the first quality level is lower than the second quality level;
  (b) delivering the first encoded sequence to the receiver;
  (c) determining a temporal position in the first encoded sequence at which to switch from transmission of the first encoded sequence to the second encoded sequence while ensuring timely delivery of the media sequence;
  wherein said temporal position is dependent on the position when the difference in the cumulative bit counts between the second encoded sequence and the first encoded sequence is greater than the predicted throughput over the transmission link multiplied by the difference in a first preload and a second preload, wherein the first preload is the playout duration of the data buffered at the receiver needed to deliver the second encoded sequence at the predicted throughput from the current temporal position, and the second preload is the playout duration of the data presently buffered at the receiver.

Preferably, if there is a plurality of positions, then the temporal position is determined as the first of such positions.

The method may comprise a further step of
  d) switching from the first encoded sequence to the second encoded sequence when transmission of the first encoded sequence reaches the determined temporal position.

The media sequence is preferably a video sequence. The quality levels may be fixed for each encoded sequence. In preferred embodiments, the quality levels are perceptual quality levels.

Preferably, the receiver performs the determining step.

The temporal position is preferably a position of a group of pictures.

Lower and upper predicted throughput values may be used to determine respective later and earlier temporal positions, and deciding to switch from the first to the second encoded sequence based on the earlier and later temporal positions.

The predicted throughout may be based on past throughput over the transmission link.

According to a second aspect of the present invention, there is provided a method of streaming a media sequence from a server to a receiver over a transmission link in a network, comprising:

(a) receiving a first encoded sequence, said first encoded sequence representing a media sequence encoded at a first quality level;

(b) determining a temporal position in the first encoded sequence at which to switch from transmission of the first encoded sequence to a second encoded sequence while ensuring timely delivery of the sequence, wherein the second encoded sequence represents the media sequence encoded at a second quality level, said first quality level being lower than said second quality level; and wherein said temporal position is dependent on the position when the difference in the cumulative bit counts between the second encoded sequence and the first encoded sequence is greater than the predicted throughput over the transmission link multiplied by the difference in a first preload and a second preload, wherein the first preload is the playout duration of the data buffered at the receiver needed to deliver the second encoded sequence at the predicted throughput from the current temporal position, and the second preload is the playout duration of the data presently buffered at the receiver.

BRIEF DESCRIPTION OF THE DRAWINGS

For a better understanding of the present invention reference will now be made by way of example only to the accompanying drawings, in which:

FIG. 6 is table showing examples of pre-calculated data associated with a bitstream;

DESCRIPTION OF PREFERRED EMBODIMENTS

The present invention is described herein with reference to particular examples. The invention is not, however, limited to such examples.

The network contains one or more network based video servers connected to one or more video receivers over a shared network. Multiple pieces of video content are each encoded at a number of constant quality levels and stored on one or more of the network based servers. In response to requests from a receiver, video content is selected on a server and delivered over the shared network to the receiver. The system selects the quality level of the stream to deliver based on characteristics of the video stream currently being delivered, and the number of bits already buffered at the video receiver and the available network throughput. The aim is to predict in advance when a switch to another quality stream can be made while ensuring that all video data is delivered over the network in time for it to be decoded and displayed without interruption. The invention in certain exemplary embodiments proposes a method for making that selection in advance.

Figure 1:
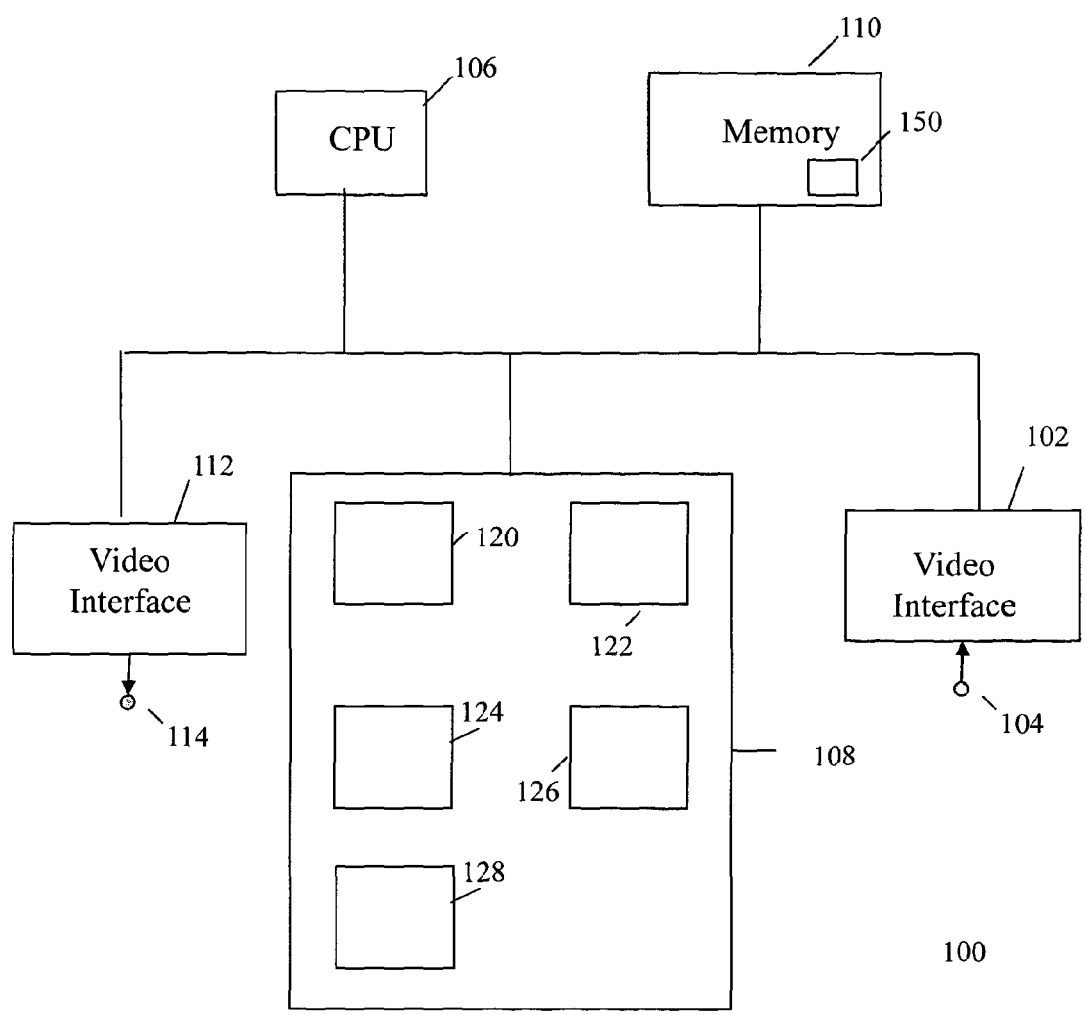
FIG. 1 is shows a video server capable of adaptive video delivery.

The server 100 shown in FIG. 1 comprises a video input interface 102 that receives digitally coded video signals 104, in uncompressed form. A processor 106 operates under control of program modules stored in local storage 108, for example a hard disk, and has access to memory 110 and a video output interface 112 for connection, via a telecommunications network to plural client devices. The video output interface 112 may include a buffer to temporarily store video encoded by the processor 106 before outputting the encoded bit stream 114. The memory includes a memory area 150 for storage of the encoded video and parameters associated with the encoded video.

The program modules include a general purpose operating system 120 and various video coding software modules which implement one of more of the video coding methods shortly to be described. The software modules comprise several program types, namely:
- a control module 122;
- a compression module 124: in this example the compression software implements a coding algorithm compliant with the ITU H.264 standard;
- a perceptual quality evaluation module 126;
- a bitstream evaluation module 128;

It is understood that plural video streams can be received, encoded and stored in storage 110, for later streaming via the output interface 112.

Figure 2:
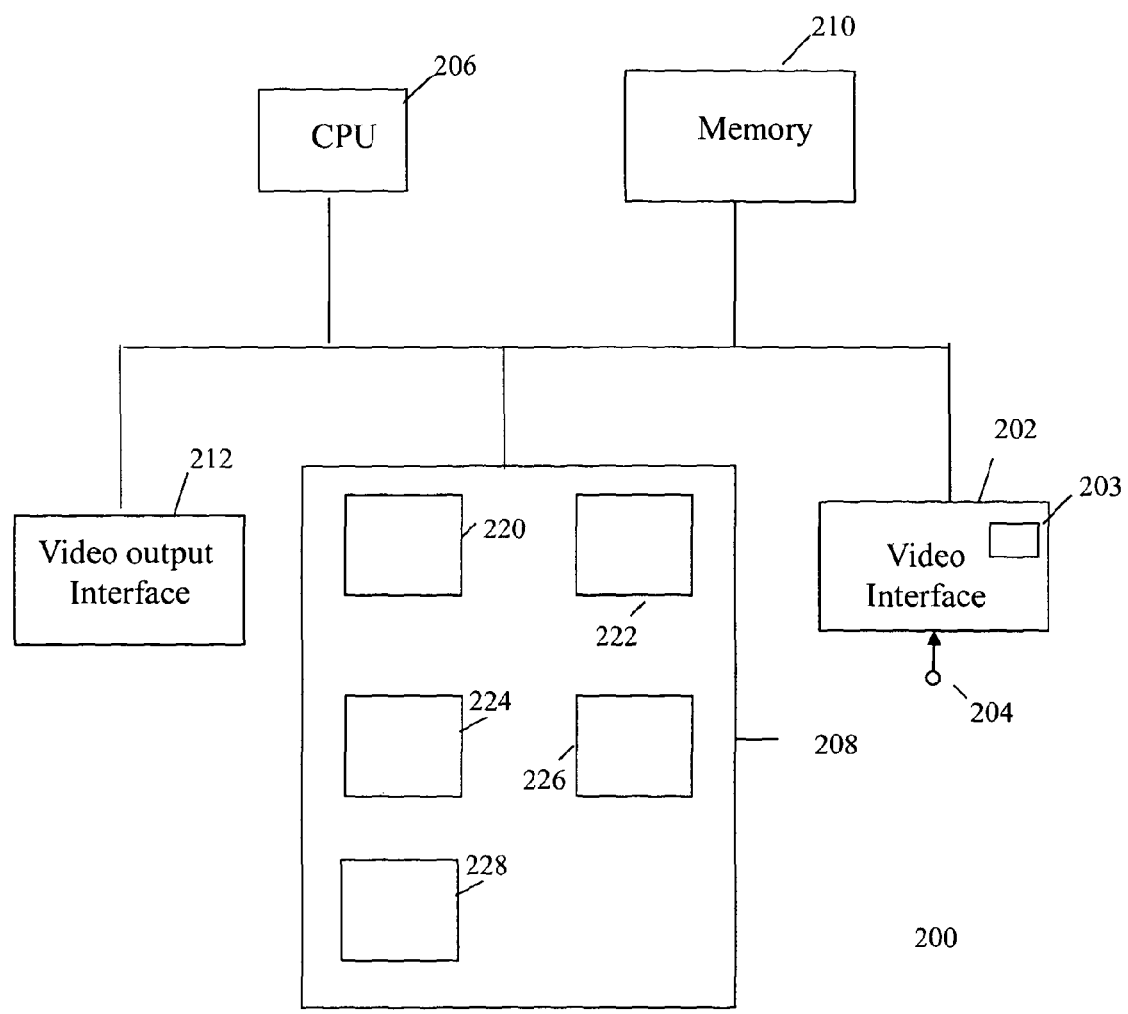
FIG. 2 is shows a receiver capable of receiving adaptive video.

The server 100 transmits encoded video to a receiver, which includes a video decoder. FIG. 2 illustrates an example receiver 200. The receiver 200 is connected to the video server 100 over a suitable network and is capable of receiving and decoding encoded video streams transmitted by the server 100.

Specifically, the receiver 200 comprises a video input interface 202 that receives encoded video signals 204, such as encoded bitstreams transmitted by the server 100. A processor 206 operates under control of program modules stored in local storage 208, for example a hard disk, and has access to memory 210 and a video output interface 212 for connection to a suitable output device such as a monitor or television. The video input interface 202 includes a buffer 203 to temporarily store received encoded video until the encoded video is ready for decoding by the processor 206.

The program modules include a general purpose operating system 220 and various video decoding software modules which implement a decoding method for decoding the received encoded video bitstreams. The software modules comprise several program types, namely:
- a control module 222;
- a decoding module 224: in this example the decoding software implements a decoding algorithm compliant with the ITU H.264 standard;
- an interpolation module 226;
- a bitstream switching module 228;

A video sequence that has been encoded at variable bit rate can be delivered over a network at piecewise constant bit rate, with the rate of each piece decreasing monotonically. This is believed to have first been noted by Professor Mohammed Ghanbari. He referred to the resulting bit rate profile as a "downstairs" function.

The applicant's international patent application WO2004/047455 describes one method of analyzing a video sequence that has been encoded at variable bit rate to determine a video delivery schedule for that sequence consisting of one or more contiguous periods of constant bit rate delivery in which the rates are monotonically decreasing.

Figure 3:
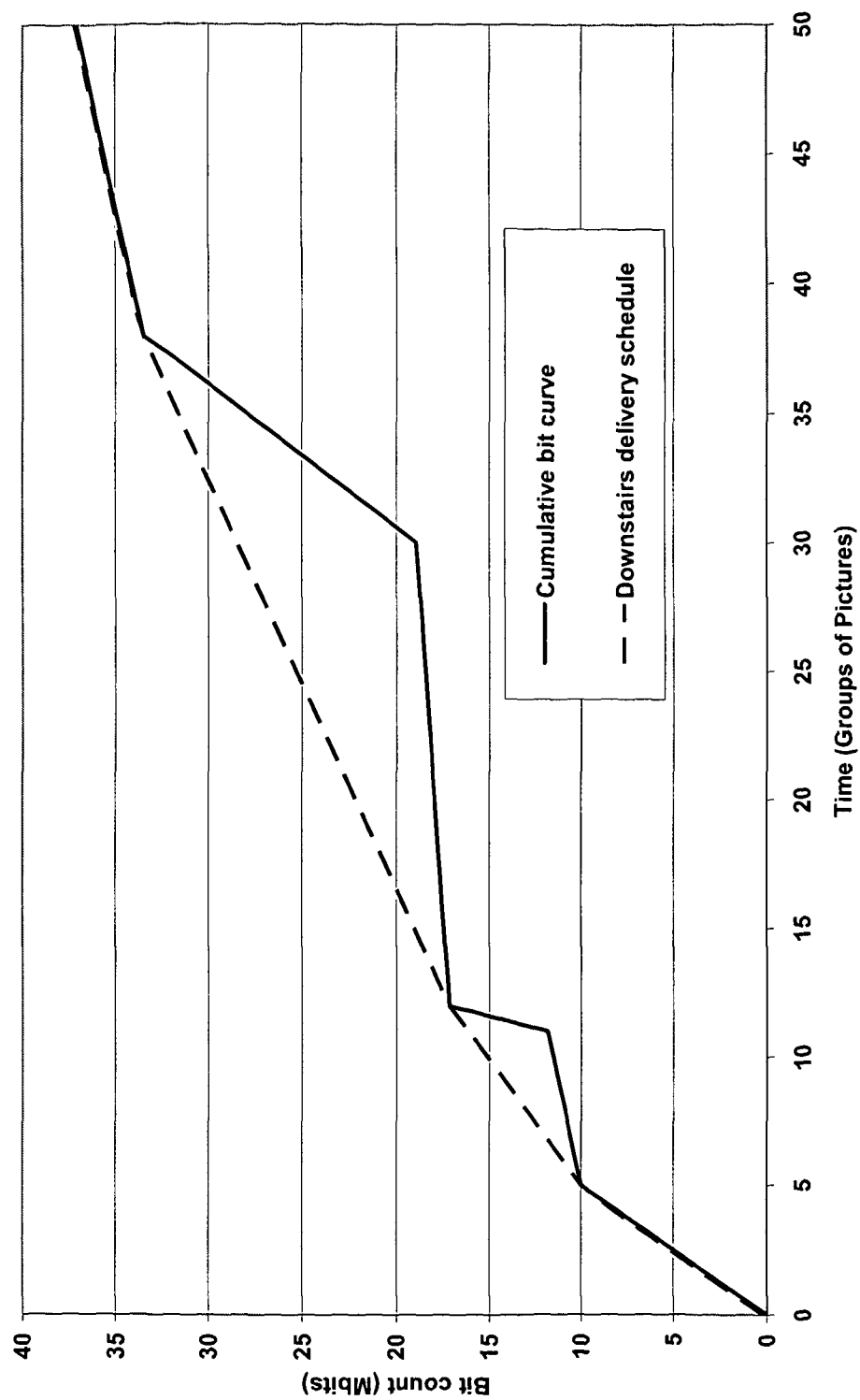
FIG. 3 is a graph showing a cumulative bit curve for a video sequence encoded at variable bit rate and its piecewise constant, monotonic decreasing, delivery schedule, referred to as the "downstairs delivery schedule"

In an alternative visualization the cumulative number of bits in the encoded video sequence is plotted against time. An example of such a cumulative bit curve is shown in FIG. 3. FIG. 3 shows the cumulative bit curve, which is a plot of the total number of bits in the encoded video sequence to date against time. The "downstairs" delivery rate required for initial delivery of this stream is the slope of the line of lowest slope that passes through the origin and is never to the right of the cumulative bit curve, that is, ensuring all bits are delivered before they are needed for decoding. Such a delivery line (or delivery schedule) will touch the cumulative bit curve in one or more places, but typically only once. When delivery to that point (or the last of those points) in the video sequence has occurred, all video bits delivered will be decoded and no bits will be buffered awaiting subsequent decoding. From this point onwards, a new line of lowest slope could be calculated, and the next coded video bits delivered at this lower rate.

Video that is encoded at constant bit rate will have a cumulative bit curve near to a straight line. Video that is not coded at constant bit rate, for example, video coded with constant quantization index or with constant perceptual quality will have a cumulative bit curve that in general will not be a straight line. Such video could be transmitted over a network with a delivery schedule similar to the cumulative bit curve, and thus require little buffering in the receiver, or, with unlimited buffering available in the receiver, could be delivered with any delivery schedule subject to every bit being received before it is needed for decoding. When plotted on a graph, with time along the horizontal axis and cumulative bits on the vertical axis, this requirement can be expressed as the delivery schedule must never be to the right of the cumulative bit curve. When there is unlimited buffering at the receiver, it is always possible to deliver any bitstream using constant bit rate delivery at any constant rate: it is just necessary to ensure decoding is delayed sufficiently to keep the delivery schedule to the left of the cumulative bit curve. In the extreme case, the whole of the video sequence could be delivered very slowly and decoding started only as the delivery is about to finish.

In the examples considered here, we consider discrete "chunks" each comprising one or more frames. The choice of chunks is subject to the consideration that, in order to keep to a minimum any interdependence of quality between chunks, a chunk can be one or more frames coded independently of any other chunk, typically starting with an I-frame (one coded without prediction from any other frame). In all the examples here, the chunk chosen was a group of pictures (GOP) of IBBP format and all the plots shown are of cumulative bits per group of pictures, $\Sigma b$, where b is the number of bits in a group of pictures, plotted against group of pictures index.

In the streaming system envisioned, each video sequence is encoded multiple times by the video server 100, each time with a different level of perceptual quality. Encoding at fixed levels of perceptual quality is preferably performed as described in the applicant's International application WO2009/112801. However, other methods of encoding could be used, such as encoding with a constant quantization index.

We assume the receiver has sufficient buffering to be able to store a whole video stream. This allows the timing of delivery of the video data to be decoupled from the decoding of it, provided we ensure data is delivered before it is needed for decoding.

The delivery bit rate required to deliver a video stream in timely fashion depends on how much data is already buffered at the receiver, and the bit rate profile of the bits yet to be decoded. By analyzing the encoded video stream at the video server 100 prior to delivery, and by monitoring the amount of data buffered at the receiver 200 following delivery by the server 100, we can determine, for each possible quality level that could be delivered, the minimum bit rate required for timely delivery.

Figure 4:
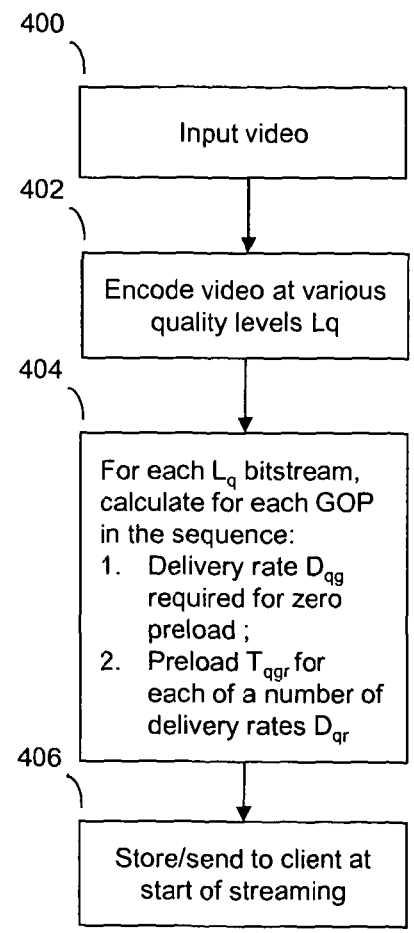
FIG. 4 is a flow chart showing the encoding of video content at various quality levels and the pre-calculation of parameters associated with each of those bitstreams.

The encoding and pre-calculations performed by the video server 100 are summarized in the flow chart of FIG. 4. In step 400 of FIG. 4, the server 100 receives a video sequence. In step 402, the compression module 124 in the server 100 encodes the video sequence at a number of fixed quality levels $L_q$ (where q=1 ... Q). The amount of data (bits) $b_{qg}$ generated for each group of pictures g (where g=1 ... G) is also determined, by the bitstream evaluation module, and stored in memory 150 together with each of the encoded bitstreams.

The quality level may for example be set by selecting a suitable quantization parameter for the encoding process.

In step 404, each of the encoded bitstreams are analyzed by the bitstream evaluation module 128 to create a file of pre-calculated data giving the following information for each quality at which the content was encoded for each group of pictures.

1) Firstly we calculate the minimum delivery rate $D_{qg}$ that would be needed for delivery (transmission) of that group of pictures and all subsequent groups of pictures without decoder buffer underflow occurring at the receiver 200 if no video is initially buffered at the decoder. This rate can be referred to as the zero start-up delay delivery rate, or zero preload delivery rate, for the given group of pictures. The term "preload" and start-up delay will be used interchangeably to refer to the duration of the video buffered at the receiver ready for playback.

So, we calculate the delivery rate $a_{qgk}$ that would be needed to deliver quality q, from group of pictures g to group of pictures k using the earlier calculated amount of bits, $b_{qg}$:

$$a_{qgk} = \left\{ \frac{1}{k-g+1} \sum_{j=g}^{k} b_{qj} \right\} \quad [1]$$

The minimum delivery rate $D_{qg}$ can then be calculated as the maximum value of $a_{qgk}$ for all k satisfying g≤k≤G:

$$D_{qg} = \text{Max}_{k=g}^{G} \left\{ \frac{\sum_{j=g}^{k} b_{qj}}{k-g+1} \right\} \quad [2]$$

This minimum delivery rate $D_{qg}$ is calculated for each group of pictures g in the sequence, and for all sequences encoded at each of the qualities $L_q$.

2) Secondly we calculate the minimum amount of time, or preload, $T_{qgr}$ that must be buffered at the receiver for delivery (transmission) of that group of pictures and all subsequent groups of pictures without decoder buffer underflow occurring at each of a set of delivery rates $D_{qr}$ (r=1 ... $r_{max}$), where the delivery rates are measured in units of bits per group of pictures period. For convenience, and so that each sequence will have the same range of relative delivery rates, the rates $D_{qr}$ may defined as fixed multiples, $C_r$, of the average coded bit rate at that quality:

$$D_{qr} = \left\{ \frac{C_r}{G} \sum_{j=1}^{G} b_{qj} \right\} \quad [3]$$

Figure 5:
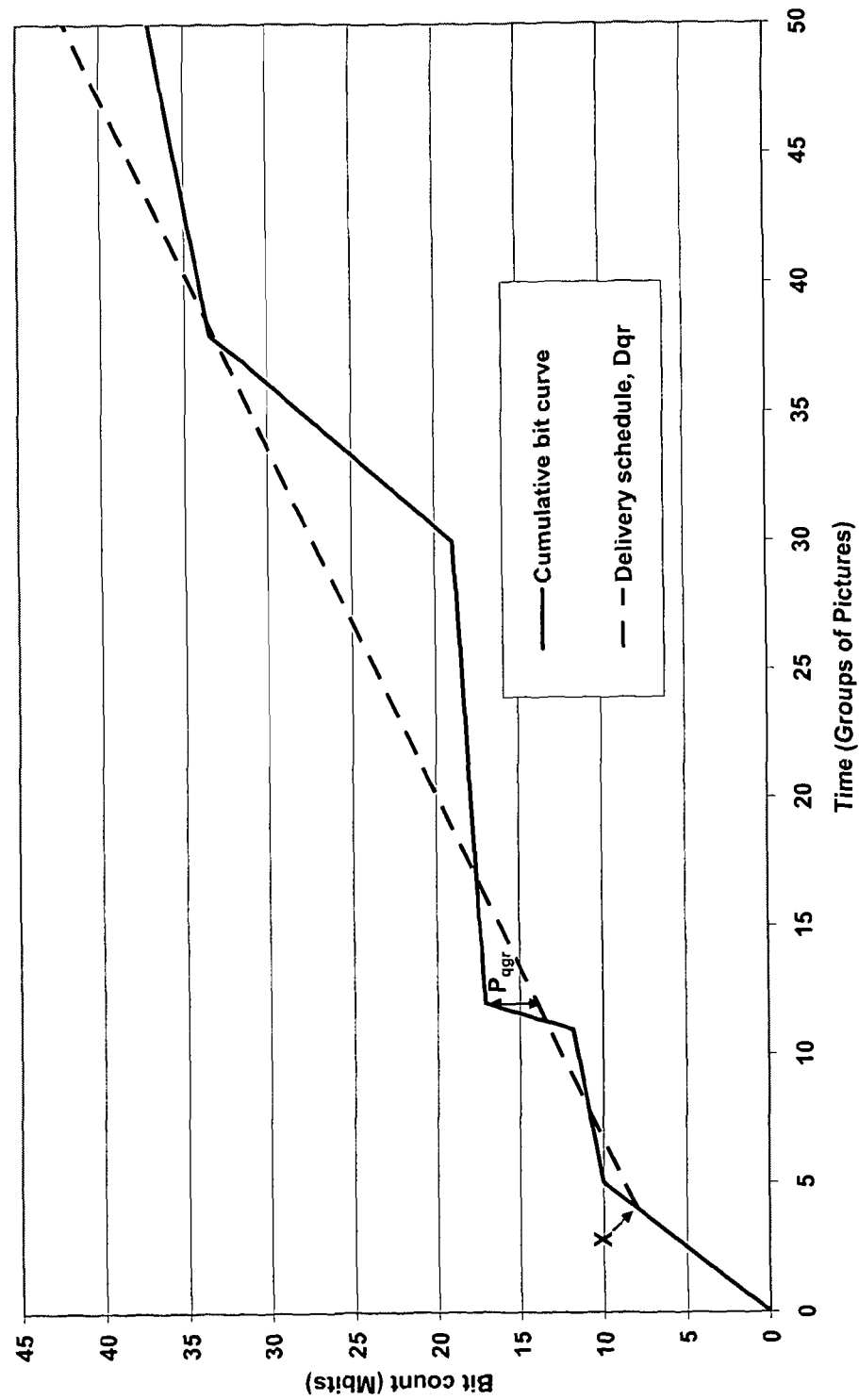
FIG. 5 is a graph showing how the preload time can be calculated for a given delivery rate.

This time $T_{qgr}$ may be visualized as being obtained by drawing, on FIG. 5, a line of slope $D_{qr}$ having origin, X, on the cumulative bit curve at group of pictures g−1. For each subsequent group of pictures, the vertical distance between the line and the cumulative bit curve is measured, and the largest distance, $P_{qgr}$, of the line below the cumulative bit curve is determined. This represents the required preload of bits for delivery at rate $D_{qr}$ starting with delivery of the group of pictures with index g. This largest distance, $P_{qgr}$, is divided by the slope $D_{qr}$ to obtain the preload $T_{qgr}$.

Thus $$P_{qgr} = \text{Max}_{k=g}^{G} \left\{ \sum_{j=g}^{k} (b_{qj} - D_{qr}) \right\} \quad [4]$$

and $$T_{qgr} = \frac{P_{qgr}}{D_{qr}} \quad [5]$$

Note, if the line in FIG. 5 is always above the cumulative bit curve and all distances are negative, then the required preload is zero.

Thus, Equation 5 can be rewritten as:

$$T_{qgr} = \text{Max}\left\{0, \frac{P_{qgr}}{D_{qr}}\right\}. \quad [6]$$

In step 406 of FIG. 4, these pre-calculated parameters from step 404 can be stored as a suitable file in memory 150. Thus, we will effectively have a table of data for each encoded video stream (at each quality $L_q$), with the following data per GOP g—the delivery rate required for zero start-up delay, and the pre-load required for each of a number of delivery rates (based on fixed multiples $C_r$ of the average bit rate of the entire stream).

FIG. 6 shows an example of a table of pre-calculated data with a video sequence of 10 GOPs, and encoded at two different quality levels $L_q$=2.7 and 3.7. Rate multiples $C_r$=0.6, 0.8, 1.0 and 1.2 are used in this example.

The pre-calculated data can be used to determine the rate required for each quality stream to be transmitted given the amount of preload at the receiver. For example, if the amount of preload at the receiver is measured to be 10 seconds, or 10000 ms, and the next GOP to be delivered is g=6, then we can see from FIG. 6 that the rate required for delivery at $L_q$=2.7 is between $C_r$=1.0 and 1.2. Similarly, for $L_q$=3.7, the rate required is between $C_r$=0.8 and 1.0. Thus, an actual streaming rate of ($C_r$=) 1.2 times the mean bit rate for $L_q$=2.7 would be sufficient to support the $L_q$=2.7 stream. However, an actual streaming rate of ($C_r$=) 1.0 times the mean bit rate for $L_q$=2.7 would not be sufficient to support the $L_q$=2.7 stream. Similarly, an actual streaming rate of ($C_r$=) 1.0 times the mean bit rate for $L_q$=3.7 would be sufficient to support the $L_q$=3.7 stream. However, an actual streaming rate of ($C_r$=) 0.8 times the mean bit rate for $L_q$=3.7 would not be sufficient to support the $L_q$=3.7 stream.

The amount of data that can realistically be pre-calculated is limited, and so it is not possible to have pre-calculated data for all possible values of preload. Thus, in order to determine more accurately the streaming rate required to support a given quality level of video when a certain preload is present at the receiver, an interpolation method is proposed as described below.

Figure 7:
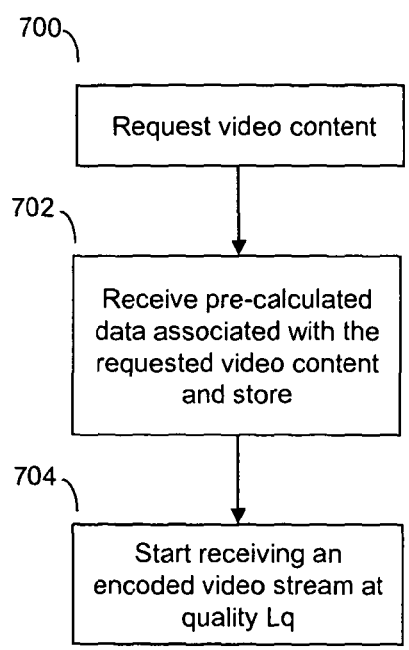
FIG. 7 is a flow chart showing how a receiver can request and receive a video stream, including the pre-calculated data.

Now, once the server has finished pre-calculating the data as described, the server 100 can start sending the encoded video to the receiver 200. FIG. 7 shows the processes at the receiver 200 when requesting video content from the server 100. Starting at step 700, the receiver 200 makes a request to the server 100 for some video content. The server 100 sends to the receiver 200 the pre-calculated data associated with the requested video, which is received by the receiver 200 in step 702. The receiver 200 stores this pre-calculated data in memory 210. The server 100 then starts streaming the requested video by selecting a suitable quality $L_q$ bitstream to transmit to the receiver 200. Thus, in step 704, the receiver 200 starts receiving the video stream encoded at quality $L_q$.

The selection of the initial quality of the bitstream to be transmitted to the receiver 200 may be done according to any suitable method by the server 100 or can be determined by the receiver 200, such as starting with the lowest quality available, or selecting the quality that is most appropriate for the available network bandwidth at that time.

Figure 8:
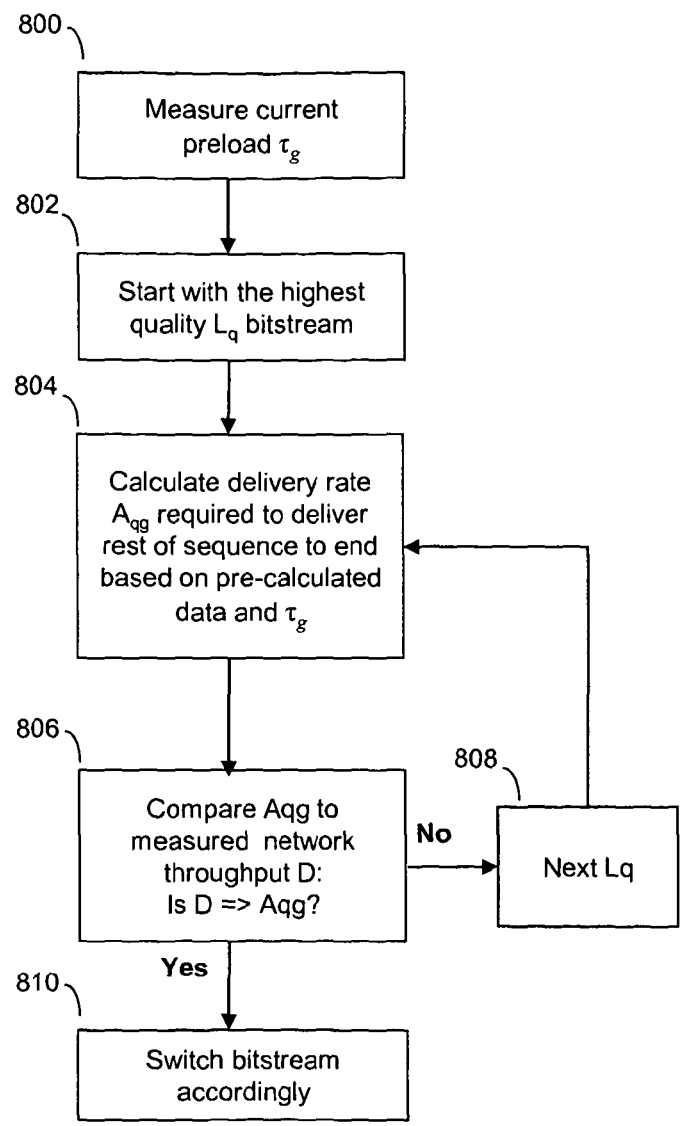
FIG. 8 is a flow chart showing how the receiver can use the pre-calculated data to determine the minimum delivery rate required to stream each quality of video.

Once the receiver 200 has started to receive the encoded video stream, the receiver can perform the steps shown in FIG. 8 using the stored pre-calculated data.

In step 800 of FIG. 8, the next group of pictures to be delivered is that with index g. The receiver calculates how much data $\tau_g$ is buffered in the receiver's buffer 203, in terms of time. $\tau_g$ is the preload or put another way, the start-up delay for the next data to be delivered. This (assuming that the units of time are group of pictures periods) is simply a count of the number of groups of pictures received minus the duration of video played out.

Then for each video quality level $L_q$, starting at the highest quality in step 802 and working downwards, calculate using the interpolation module 226 in step 804 a delivery rate $A_{qg}$ that would be sufficient to deliver the group of pictures with index g and all subsequent groups of pictures at this quality without decoder buffer underflow occurring using an interpolation method and based on the pre-calculated data stored at the receiver, as follows.

We need to know the delivery rate required given the amount of data already buffered at the receiver, which if measured in terms of the play-out time it represents, corresponds to the preload or start-up delay for the next data to be delivered. As it is not feasible to generate pre-calculated data for all possible values of start-up delay, we can estimate the delivery rate required by interpolation using the information that we have pre-calculated.

Figure 9:
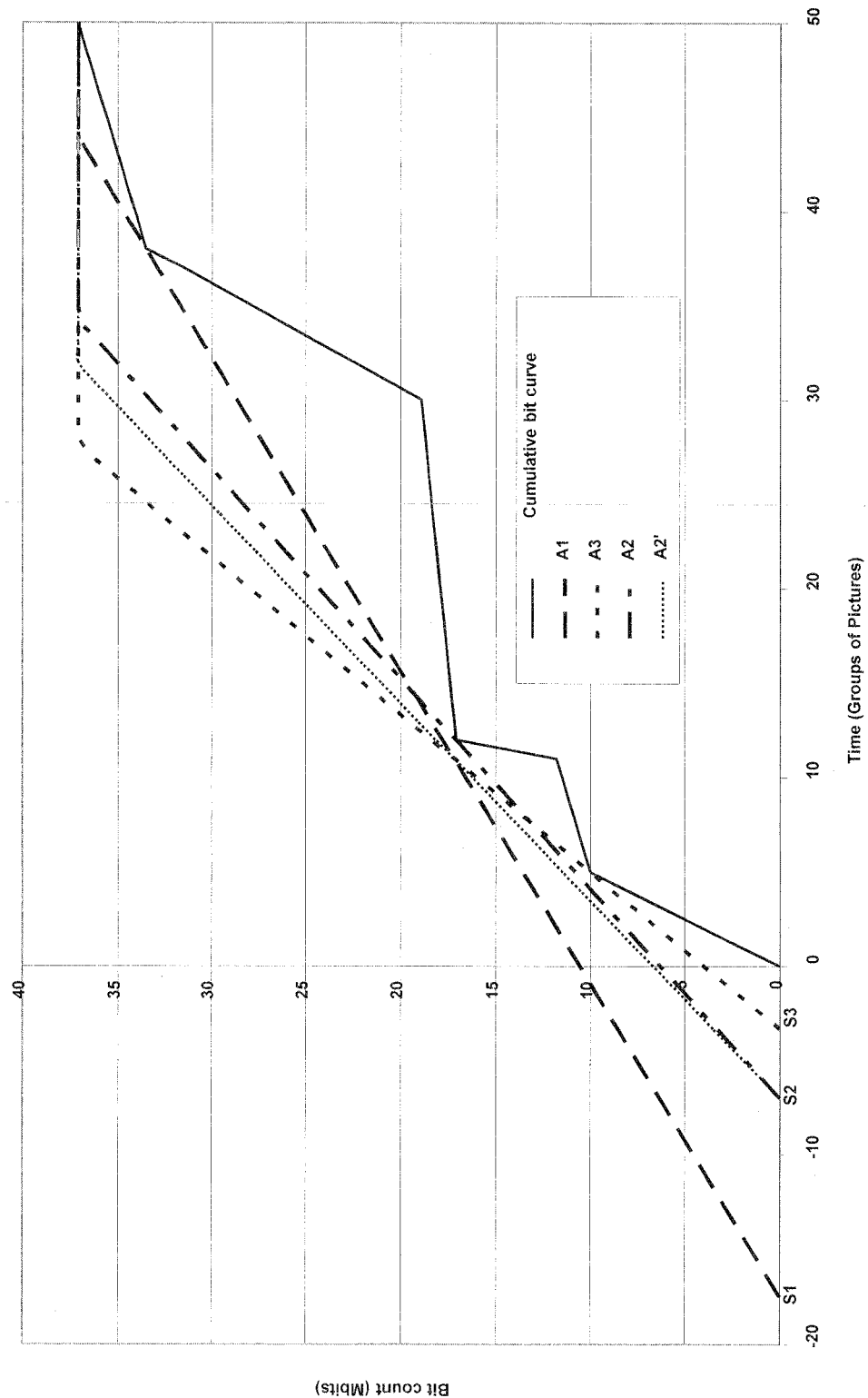
FIG. 9 is a graph showing the delivery rate required when a given amount of data is already buffered at the client can be estimated from two sets of pre-calculated data associated with a smaller and larger delivery rate.

FIG. 9 shows how the delivery rate required when a given amount of data is already buffered at the client can be safely estimated from two sets of pre-calculated data, one giving the amount of preload required for a smaller delivery rate and the other giving the amount of preload required for a larger delivery rate.

FIG. 9 shows the cumulative bit curve and delivery schedules for three delivery bit rates, A1, A2 and A3. The minimum amounts of preload required, expressed as start-up delays for the next data to be delivered, S1 and S3, for the delivery rates A1 and A3 respectively, have been pre-calculated. The optimum rate for the actual start-up delay S2 present at the receiver (measured as $\tau_g$), where S2 is between S1 and S3, would be A2 and would give the dot-dash line shown. However, we do not have any pre-calculated data for preload S2 and thus the required delivery rate A2. The problem then is to provide a safe estimated value A2' for the delivery rate A2 required for start-up delay S2, i.e. A2'≥A2. The solution is to select pre-calculated data that we do have, specifically a preload S1 that is greater than S2, and preload S3 that is less than S2 and their respective delivery rates A1 and A3, and apply the interpolation method set out below.

To ensure timely delivery of bits, the delivery schedule A2' must be on or to the left of the cumulative bit curve. This is ensured if the delivery schedule A2' passes through the intersection of the delivery schedules, A1 and A3, which occurs at time T. The intersection of the delivery schedules A1 and A3 occurs when the total bits B delivered by each delivery schedule are equal (taking into account the respective preloads). Thus, we can say:

$$A1 \cdot (T+S1) = A3 \cdot (T+S3) \quad [7]$$

Equation 7 can be rewritten as Equation 8 below to give the intersection time T.

$$T = \frac{S3 \cdot A3 - S1 \cdot A1}{A1 - A3} \quad [8]$$

An acceptable delivery rate for start-up delay S2 is the straight line of slope A2' passing through this point, given by Equation 9 below. As shown in FIG. 9, this may not optimal.

$$A2' = \frac{(S1+T) \cdot A1}{S2+T} \quad [9]$$

Thus, Equation 9 gives a safe estimate of the minimum delivery rate $A_{qg}$, that is, the rate is sufficient deliver the group of pictures with index g and all subsequent groups of pictures without decoder buffer underflow at the receiver 200, but may be more than is absolutely necessary.

Referring to the example described above in relation to FIG. 6 where the next GOP g=6, and the measured preload is 10000 ms. Let's assume the average bit rate for $L_q$=2.7 is 262 kbit/s. For $L_q$=2.7 stream, set S1=11799 ms, S3=1127 ms, A1=262 (1.0×262), and A3=314.4 (1.2×262). Thus, applying equation 8, we get T=52233. Now, using equation 9, this calculated value of T and S2=10000 ms, we get A2'=269.6 kbit/s. Thus, the minimum delivery rate $A_{qg}$=269.6 kbit/s. If the network throughput is at least 269.6 k/bit/s, then the $L_q$=2.7 stream can be supported from GOP g=6 onwards.

In step 806, $A_{qg}$ can be compared to the actual network throughput D to determine if the required minimum rate is met. If the D is at least equal to $A_{qg}$, then stream of quality $L_q$ under consideration can be streamed by the network. Thus, in step 810, a decision can be made to switch to, or remain on, this $L_q$ quality level stream. The decision as to exactly when to switch may be based on other factors, such as tolerances and thresholds relative to the calculated minimum $A_{qg}$. If D is not at least $A_{qg}$, then processing passes to step 808, where the pre-calculated data for the next lowest $L_q$ stream can be analyzed, and steps 804 onwards repeated to determine the minimum delivery rate $A_{qg}$ required for the this next stream $L_q$.

Steps 804 and 806 can be repeated for all quality levels if required to get a picture of the rates required for each quality level of stream.

After such calculation of the minimum delivery rate required for each quality of video encoding, the video streaming system (in a preferred example, the receiver) would determine, in consideration of the expected network throughput, which quality of video to transmit next. The expected network throughput may be estimated from past measurements of actual throughput or by other means. Other factors, such as the amount of data buffered at the receiver, may also be taken into account when making the decision of which quality of video to transmit next. For example, it may be decided not to switch to a higher quality if less than a threshold of data, such as that which would take five seconds to display, were buffered at the receiver, or it may be decided to switch to a lower quality if less than a threshold of data were buffered, regardless of how the expected network throughput compares to the delivery rate required for each quality of video encoding. The decision of which quality of video to switch to could be made as often as every group of pictures, as it is possible to change between the different encodings at the start of any group of pictures.

The decision to switch to a different quality stream is done by the bitstream switching module 228. The receiver 200 can send a request to the server 100 to ask it to start transmitting a different quality video stream selected (as chosen by the receiver). The server may immediately switch and transmit the new stream, which may be delayed until a suitable switching point such as at the start of a new GOP. The server can then send data to the receiver to indicate that a switch has been made, and also start transmitting the new video stream.

The problem with the above method for determining whether a switch can be made or not to a different quality stream is that the calculations need to be made every group of pictures. We will now describe a method that allows us to avoid repeating the above calculations and decisions after receiving each group of pictures, but still enabling a change to a higher quality as soon as possible.

Figure 10:
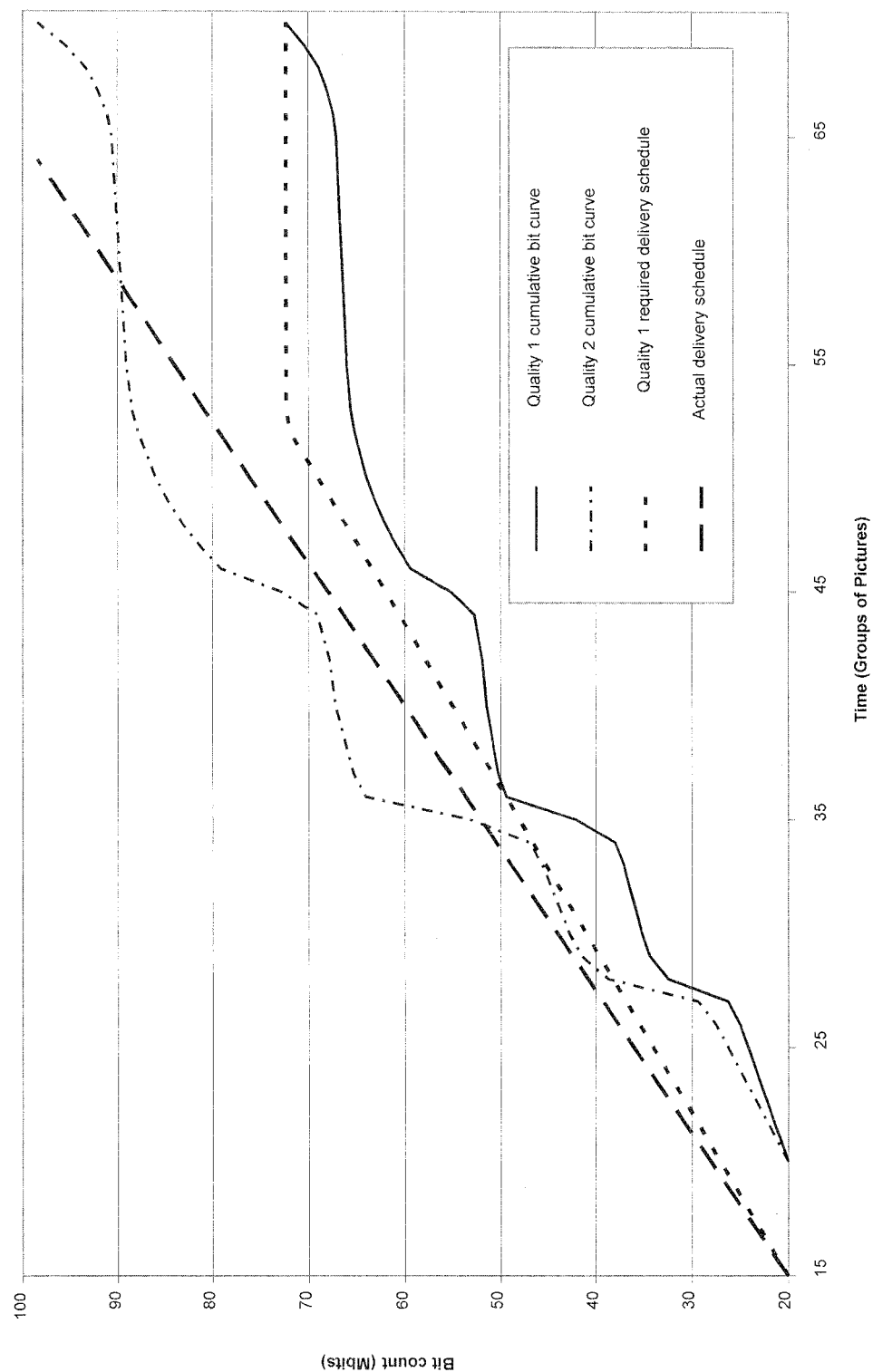
FIG. 10 is a graph showing the cumulative bit curve for a video sequence encoded at two different levels of quality, the required delivery schedule for the stream with the lower quality, and an actual delivery schedule.

FIG. 10 shows the cumulative bit curve for a video sequence encoded at a lower quality, "Quality 1", and the cumulative bit curve for the same video sequence encoded at a higher quality, "Quality 2". The Quality 1 curve is shown as the lower solid curve in FIG. 10, and the Quality 2 curve is shown as the upper solid curve. FIG. 10 also shows the required delivery schedule for stream "Quality 1" (the short dashed line) when the data for the group of pictures with index 21 is about to be delivered five group of pictures periods before the time at which its decoding and displaying will begin: in other words, five groups of pictures are buffered awaiting decoding and displaying. This schedule is the line of lowest slope that passes through the starting point (15, 20) and is never to the right of the cumulative bit curve for "Quality 1", that is, ensuring all bits are delivered before they are needed for decoding. Such a delivery schedule will touch the decoding schedule in one or more places, but typically only once.

Note that the required delivery rate after the delivery schedule touches the decoding schedule could be lower than shown. When delivery to that point in the video sequence has occurred, all video bits delivered will be decoded and no bits will be buffered awaiting subsequent decoding. But from this point onwards, a new line of lowest slope could be calculated, and the next coded video bits could be delivered at this rate.

FIG. 10 also shows an actual, delivery schedule (the long dashed line), calculated in consideration of the expected network throughput. This is faster than is needed for timely delivery of "Quality 1", as the line is steeper than the required delivery schedule for "Quality 1". However, this actual delivery schedule is not fast enough to deliver the higher quality stream "Quality 2" from the group of pictures with index 21, as it would not deliver all of the bits by the time that they were needed, as indicated where the cumulative bit curve for "Quality 2" is to the left of the actual delivery schedule. Buffer underflow would occur around when group of pictures with index 35 is decoded, with the required bits received thereafter as a result of the actual delivery schedule being insufficient for the Quality 2 stream.

However, it may be possible to deliver "Quality 1" with the actual delivery schedule for a certain length of time, and then switch to deliver "Quality 2" with the same delivery schedule. As described above, the decision of which quality of video to transmit could be made by determining, after transmission of each single group of pictures, the required delivery rate for "Quality 1" and for "Quality 2", given the amount of data that had already been delivered and buffered but not yet decoded.

When a switch from stream "Quality 1" to stream "Quality 2" occurs, the cumulative bit curve for the combined video sequence follows the cumulative bit curve for "Quality 1" up to the switching point, and then follows the cumulative bit curve for "Quality 2", shifted down to the point on the cumulative bit curve for "Quality 1" at the time of switching. Note that switching time in this context is the time at which switching occurs in the decoding process: switching in the delivery process would have occurred earlier in time.

Figure 11:
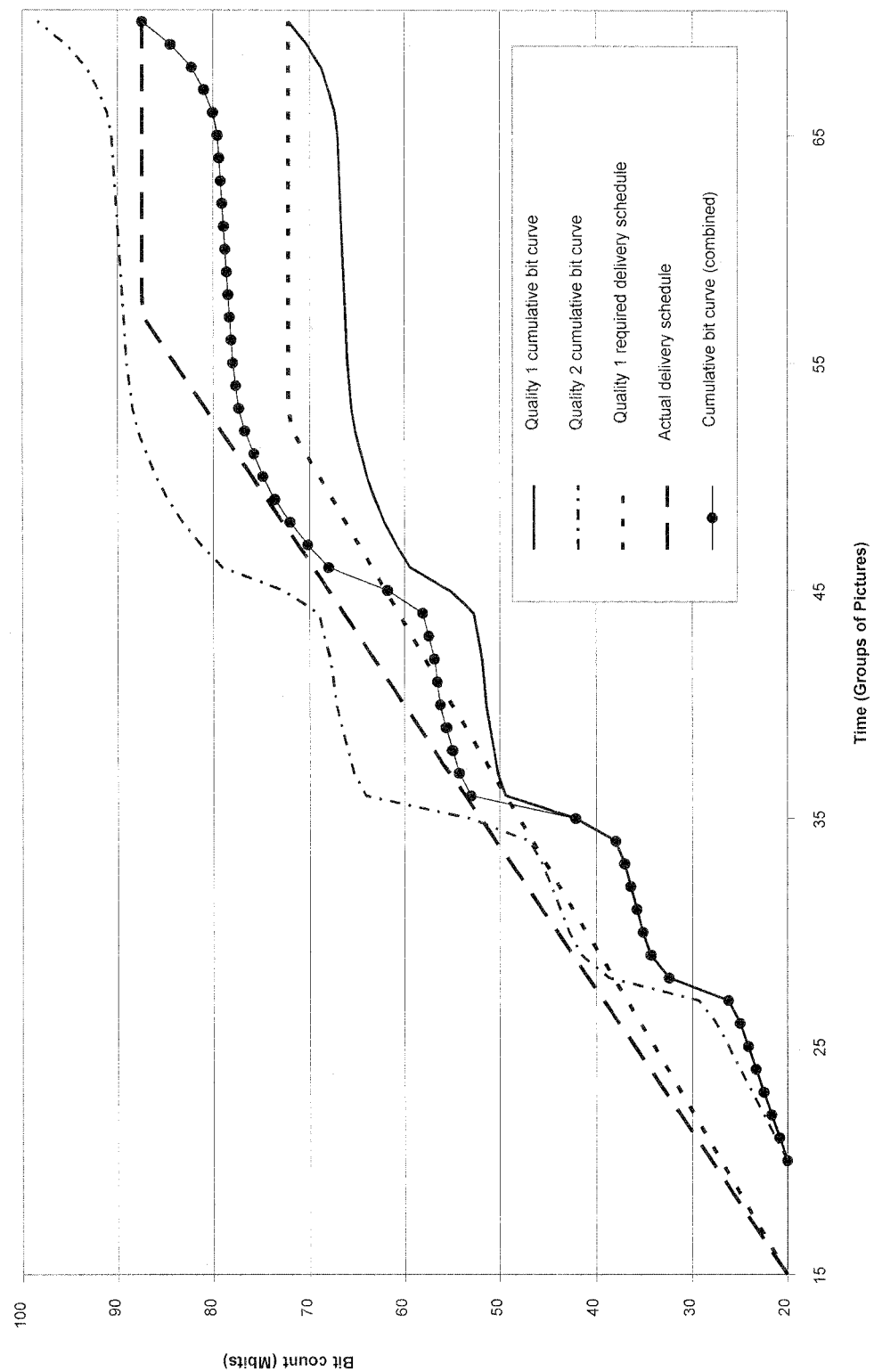
FIG. 11 extends FIG. 10 with the addition of a cumulative bit curve for the combined video sequence formed by initially delivering the video sequence encoded with the lower quality and then switching to delivering the video sequence encoded with the higher quality.

FIG. 11 is the same as FIG. 10, but with the addition of a cumulative bit curve for the combined video sequence (the dotted solid curve). It can be seen that groups of pictures 21 to 35 are delivered from stream "Quality 1", and hence the curve follows the cumulative bit curve for stream "Quality 1", and groups of pictures 36 to 70 are delivered from stream "Quality 2", with this part of the curve being the cumulative bit curve for stream "Quality 2" shifted down to match that of stream "Quality 1" at group of pictures 35, the last to be delivered from stream "Quality 1". It can be seen that this combined stream can be delivered in a timely fashion according to the actual delivery schedule.

Let g be the index of a group of pictures, and let $B_{qg}$ be the cumulative bit count for group of pictures g (g=1 . . . G), for encoding at quality q, as given in Equation 10 below, where $b_{qg}$ is the amount of data generated for each group of pictures. Let $B_{q0}=0$.

$$B_{qg} = \sum_{j=1}^{g} b_{qj} \quad [10]$$

Let $g_L$ be the value of g for the last group of pictures in the combined video stream in FIG. 11 coded with quality q=1: subsequent groups of pictures in the combined video stream are coded with quality q=2. The cumulative bit curve for the combined stream, $B^C_g$ is as given in Equation 11 as follows.

$$B^C_g = \begin{cases} B_{1g} & \text{if } g \leq g_L \\ B_{2g} - (B_{2g_L} - B_{1g_L}) & \text{otherwise} \end{cases} \quad [11]$$

Thus, up to and including group of pictures $g_L$, the cumulative bit curve is that for the quality q=1 stream for all g, $B_{1g}$. For group of pictures g after $g_L$, the cumulative bit curve follows that of quality q=2 stream for all g, but shifted down by the difference between the cumulative bit curves for q=1 and q=2 $g_L$.

Let the number of groups of pictures already delivered be $g_D$. The total amount of data delivered, assuming it all to be at quality q=1, is $B^C_{g_D}$. Now consider the delivery of further data. Let the number of groups of pictures delivered be g, where g>=$g_D$, and let the amount of further data delivered, by the time that group of pictures g is about to be decoded, be $D_g$. $D_g$ is given by Equation 12 below, where R is the rate of delivery, measured in units of bits per group of pictures period, and S is the time between when the next group of pictures, $g_D+1$, is about to be delivered and when its decoding and displaying will begin. That is, S represents the start up delay or preload for the next data to be delivered, representing group of pictures $g_D+1$, measured in units of group of pictures periods.

$$D_g = R \cdot (S + g - g_D) \quad [12]$$

The rate of delivery R is the predicted or expected network throughput of the transmission link between the server and the receiver. This can be calculated based on historical measures or some other prediction method.

The aim is to determine the earliest time at which a switch from the stream with quality q=1 to the stream with quality q=2 can be made while ensuring timely delivery. Quality q=1 is of a lower quality than q=2, so the decision we are trying to make is when to switch from a lower to a higher quality. This equates to finding the smallest value of $g_L$ such that cumulative bit curve for the combined stream, $B^C_g$ is always less than or equal to the total amount of data delivered, represented by the sum of the amount of data already delivered, $B^C_{gD}$, and the amount of further data delivered, $D_g$, as in Equation 13 below.

$$B_g^C \le D_g + B_{gD}^C \qquad [13]$$

We assume that the actual delivery schedule is capable of delivering the stream with quality q=1 in a timely fashion. Therefore, the actual delivery schedule is capable of delivering the first $g_L$ groups of pictures of the combined stream, as this part of the combined cumulative bit curve is the same as the cumulative bit curve of the stream with quality q=1. Therefore, to determine whether it is possible to deliver the combined stream, it is only necessary to study groups of pictures after the switching point, i.e. g>$g_L$. By combining Equations 12 and 13 we get Equation 14.

$$R \cdot (S + g - g_D) \ge B_g^C - B_{gD}^C \qquad [14]$$

We know that any delivery rate can be used to deliver any stream in a timely fashion, provided that a sufficient start-up delay between starting delivery and starting decoding is used: in the extreme case, the whole of the stream could be delivered before decoding is started. Therefore, the actual delivery rate, R, is capable of delivering the whole of the stream with quality q=2, starting with group of pictures $g_D+1$, given a suitable start-up delay $S_2$, $S_2 \ge S$. Such a start-up delay has the effect of moving the actual delivery schedule to the left by $S_2-S$.

By substituting $S_2$ into Equation 12 and $B_{2g}$ into Equation 13 and combining them to eliminate the delivery schedule, we get the constraint of Equation 15.

$$B_{2g} - B_{gD}^C \le R \cdot (S_2 + g - g_D) \text{ for all } gp \ge 21 \text{ in this example} \qquad [15]$$

We now limit the range of g to groups of pictures after the switching point, i.e. g>$g_L$, and combine with Equation 11 to get Equation 16.

$$B_g^C + (B_{2g_L} - B_{1g_L}) - B_{gD}^C \le R \cdot (S_2 + g - g_D) \text{ for all } g > g_L \qquad [16]$$

Which can be rewritten as Equation 17.

$$R \cdot (S + g - g_D) \ge B_g^C + (B_{2g_L} - B_{1g_L}) - B_{gD}^C - R \cdot (S_2 - S) \text{ for all } g > g_L \qquad [17]$$

However, Equation 17 must still satisfy the condition of equation 14, which results in the condition set out in Equation 18.

$$(B_{2g_L} - B_{1g_L}) \ge R \cdot (S_2 - S) \text{ for all } g \ge g_L \qquad [18]$$

Therefore, Equation 18 allows us to determine in advance when we will be able to switch from the stream with quality q=1 to the stream with quality q=2: we find the smallest group of pictures index $g_L$ for which the condition is true as set out in Equation 19.

$$g_L = \mathrm{ArgMin}_g^G \{ (B_{2g} - B_{1g}) \ge R \cdot (S_2 - S) \} \qquad [19]$$

To avoid having to check data over the whole video sequence, we assume that the left hand side of Equation 18 is a monotonically increasing function of $g_L$. By considering Equation 10, it can be seen that this assumption is equivalent to the assumption that the number of bits generated by encoding any group of pictures at a given quality will not be less than the number of bits generated by encoding the same group of pictures at a lower quality. Given that encoding will in practice be done at a small number of different qualities, and that the differences between these qualities will be non-trivial, this assumption is highly likely to be valid. In our experiments with such quality settings, we have not found a single group of pictures for which the assumption is not correct.

The two parameters on the left hand side of Equation 18 are the cumulative bit counts for encoding the video sequence at the two qualities q=2 and q=1 respectively, which can be pre-calculated by the server 100 and stored as part of the pre-calculated data provided to the receiver. R is the estimated future network delivery rate; and S is the amount of data, measured in time units, that is already buffered at the client, and which can be determined as previously described. The remaining parameter in Equation 18 is $S_2$, the start-up delay that is needed to deliver the remainder of the content at quality q=2 at the delivery rate R. This delivery rate R and associated start-up delay may be included in the pre-calculated data as exact values, but in general, and as discussed above, it will not be. In such cases, the values can be obtained by interpolation using pre-calculated data, in a similar fashion to the interpolation described in Equations 8 and 9, or by using any other suitable method. In this previous interpolation, the start-up delay was known and the required delivery rate was calculated. In this case the delivery rate R is known, and it is the start-up delay $S_2$ that is to be calculated.

If the interpolation method is used, the intersection time T, as calculated in Equation 8 is still applicable, but Equation 9 is re-arranged into Equation 20 below to give the start-up delay as a function of the delivery rate. For consistency with Equations 8 and 9, the letter A has been used to indicate the delivery rate, and hence in Equation 20, A2 is the estimated future network delivery rate that we have referred to as R in the description immediately above, similarly S2 equates to $S_2$ above, and A1 is a delivery rate for which a start-up delay value, S1, has been pre-calculated and stored in the pre-calculated data.

$$S2 = \frac{(S1 + T) \cdot A1}{A2} - T \qquad [20]$$

We can use interpolation to calculate a value S2 whenever the delivery rate R (A2 in Equation 20) is greater than the lowest value for which pre-calculated data exists, and then apply Equation 18 to calculate when it will be possible to switch from the stream with quality q=1 to the stream with quality q=2. Note that when the delivery rate R is less than the lowest value for which pre-calculated data exists, we cannot determine a required start-up delay using the pre-calculated data as described above, regardless of whether we are using Equation 18 to predict a switching time, or simply determining which of encodings of the video stream we are currently able to transmit in a timely fashion.

As an example, we will now describe how Equation 18 could be applied to the case of FIG. 11 to determine the future time at which it will be possible to switch from the stream with quality q=1 to the stream with quality q=2. At the current point in time, 15.0 group of pictures periods on the figure, 20 MBits have been delivered to the receiver. This data will be decoded at time 20 group of pictures periods. Hence the start-up delay for the next data to be delivered is S=5.0 group of pictures periods. The delivery rate has been measured to be R=1.6 MBits per group of pictures period.

We can estimate the start-up delay S2 for delivering the stream with quality q=2 from this point at the rate R using pre-calculated data and the interpolation method described, although any other suitable method could be used as described before. Let us assume that we have pre-calculated, for the stream with quality q=2, starting with the transmission of group of pictures 16, that when transmitting at rate A1=1.5 MBits per group of pictures period the start up delay S1 is 14.1280 group of pictures periods, and that when transmitting at rate A3=1.8 MBits per group of pictures period the start up delay S3 is 8.5000 group of pictures periods. Then using Equation 8 we calculate the intersection time T as 19.6400 group of pictures periods (from the current position in time, that is, at an absolute time of 34.6400 group of pictures periods). And then using Equation 20 we calculate S2 as 12.0175 group of pictures periods The constraint of Equation 18 therefore leads to the problem of Equation 21 below.

$$g_L = \text{ArgMin}_{g=21}{}^G\{(B_{2g} - B_{1g}) \geq 1.6 \cdot (12.0175 - 5.0) = 11.2280\} \quad [21]$$

By calculating the difference between the cumulative bit counts for the stream with quality q=2 and the stream with quality q=1, we find a monotonic increasing sequence of numbers, with the first that is greater than or equal to 11.2280 being 14.70 when g=36, which is the switching point. Thus, the group of pictures with index 36 is the last that needs to be transmitted at quality q=1, and, assuming that the delivery rate R of 1.6 MBits per group of pictures period, is actually achieved, subsequent groups of pictures could be transmitted at quality q=2.

The above method can be performed by the receiver 200 given suitable data in addition to any pre-calculated data if interpolation is to be used. The required additional data may include cumulative bit data, or suitable bit data for each GOP to allow the required cumulative bit data to be derived.

Figure 12:
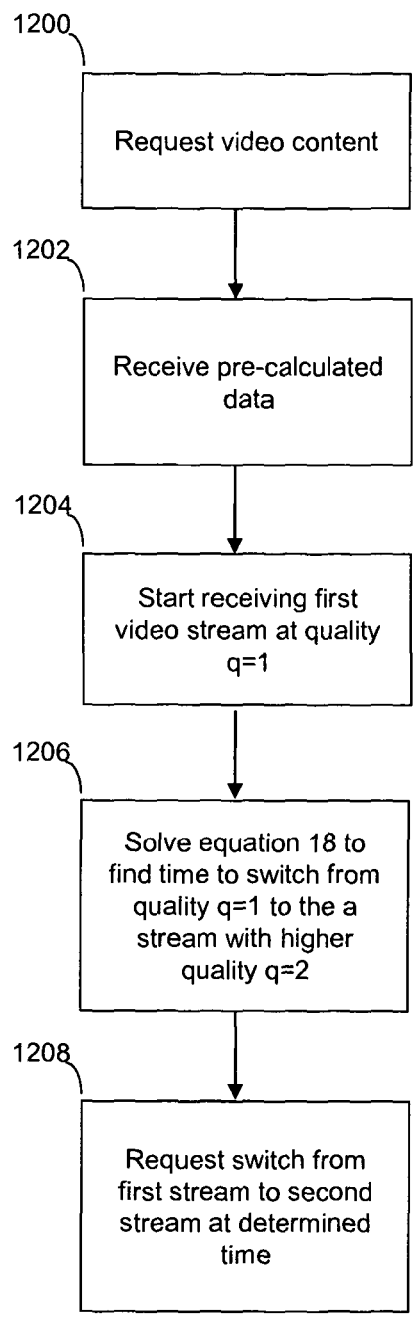
FIG. 12 is flow chart summarizing the method for predicting the switch-up time as performed by the receiver.

FIG. 12 is a flow chart summarizing the method for predicting the switch-up time as described above as performed by the receiver 200. In step 1200, the receiver requests streaming of some video content. In step 1202, the receiver receives pre-calculated data including cumulative bit data or similar as described above associated with that content. In step 1204, the receiver starts receiving the first encoded video stream representing the requested video content encoded at quality q=1. In step 1206, equation 18 above is used to determine the time at which switching from the first encoded stream to the second encoded stream should be done. In step 1208, a request can be made by the receiver 200 to the server 100 to switch to the second encoded stream encoded at quality q=2 when transmission of the first stream reaches the determined time.

In some cases it may not be possible to make a precise estimate of the future achievable delivery rate. In this case it may be more appropriate to solve Equation 18 for a range of values of the delivery rate R.

For example, a lower value and a higher value could be determined for the delivery rate R, and Equation 18 solved for each of these to give a later possible group of pictures index at which switching would be possible and an earlier possible group of pictures index at which switching would be possible. Then the actual achieved delivery rate could be measured, and, at an appropriate time, either switching could be performed or the precise calculation of whether switching is possible could be done using the earlier described interpolation method or any other suitable method.

Figure 13:
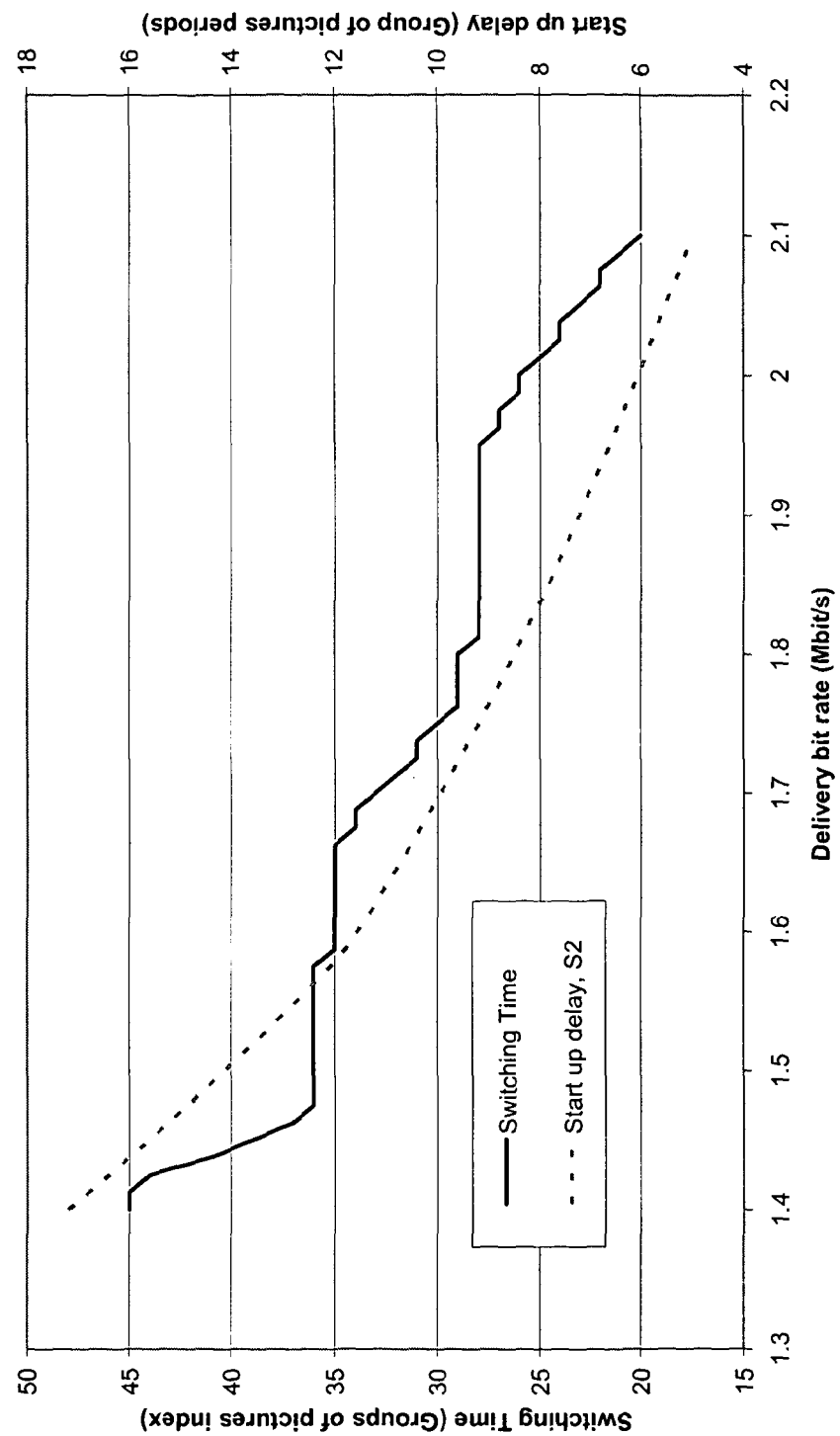
FIG. 13 shows how the future time at which it is possible to switch from delivering one quality of video to delivering a higher quality of video varies with the future network throughput, and shows how the start up delay required for delivering the higher quality video stream varies with its delivery rate.

FIG. 13 shows the effect of varying the delivery rate R on both the start up delay S2 and the time at which it would be possible to switch to the higher quality video stream. In order to solve Equation 19 for different values of R, we must first evaluate S2, by for example using Equation 20, for the given value of R, and then solve Equation 19 for the earliest possible switching time.

We now continue the earlier example, and assume that the delivery rate has again been measured to be R=1.6 MBits per group of pictures period, but this time we wish to allow a tolerance on this being the future delivery rate, and hence wish to evaluate the switching time at both a lower and a higher delivery rate. When R=1.5 MBits per group of pictures period, we calculate using Equation 19 that the group of pictures with index 36 is the last that needs to be transmitted at quality q=1, and when R=1.8 MBits per group of pictures period we calculate using Equation 19 that the group of pictures with index 29 is the last that needs to be transmitted at quality q=1. If we then continue to deliver at quality q=1 and we achieve and measure a delivery rate of 1.65 MBits per group of pictures period, we know that we will not be able to switch to a higher quality before the group of pictures with index 29, but could do so at or before the group of pictures with index 36. We may then choose to perform new calculations after delivering the group of pictures with index 29, or some later group of pictures, perhaps chosen by interpolation between the calculated bounds, or we may simply wait until after delivering the group of pictures with index 36 and then switch to the higher quality stream.

Figure 14:
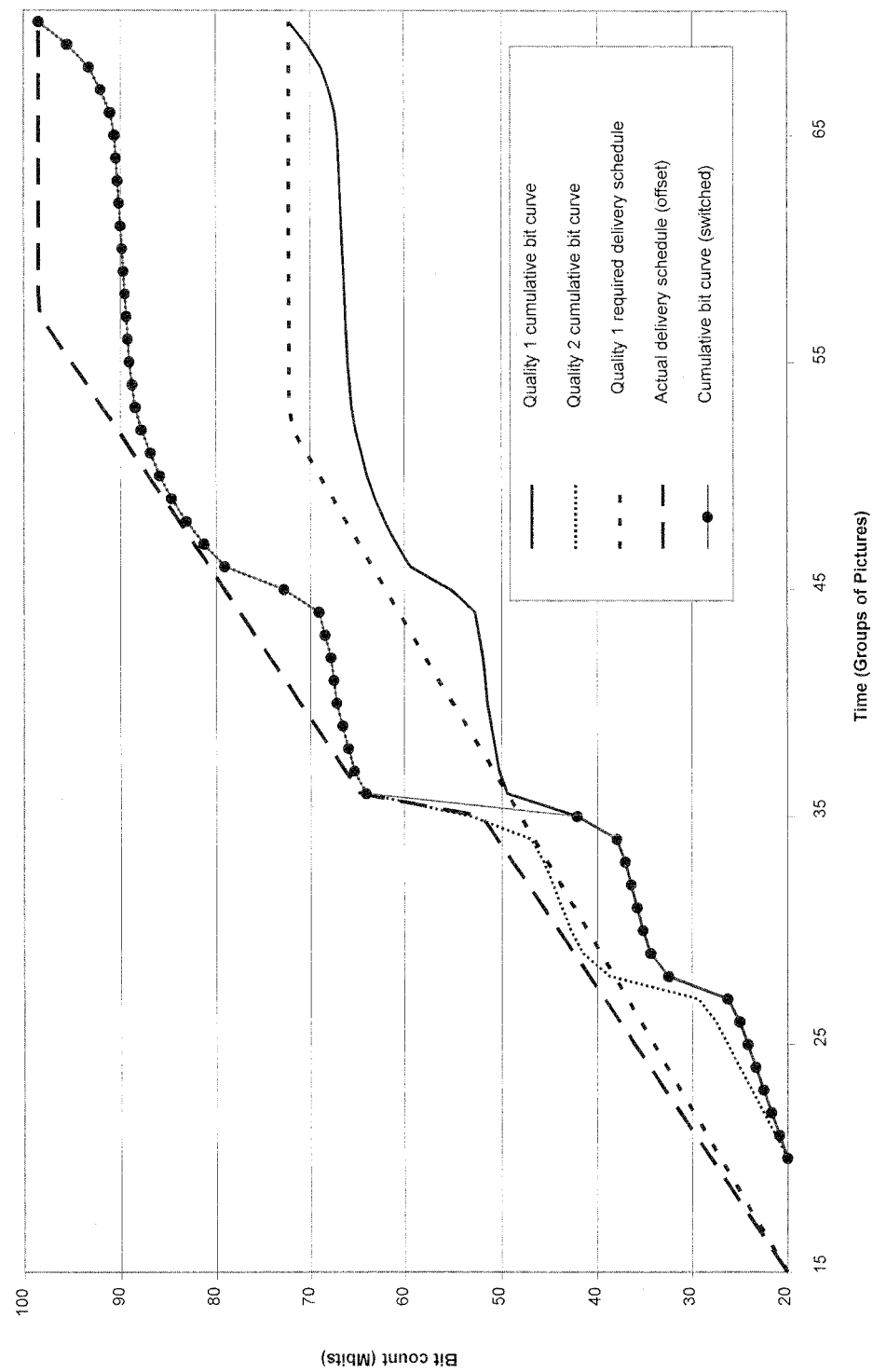
FIG. 14 shows an alternative representation of the effect of switching to FIG. 11, in which the cumulative bit curve for the combined video sequence is illustrated as a switch between the two original cumulative bit curves and in which the actual delivery schedule is drawn with a step in it at the switching point.

FIG. 14 shows an alternative representation of the effect of switching to FIG. 11: like FIG. 10, it shows the cumulative bit curves for a video sequence encoded at two different levels of quality and the required delivery schedule for the stream with the lower quality. But in this case, unlike in FIG. 11, the cumulative bit curve for the combined video sequence (the dotted solid curve) is illustrated as a switch between the two original cumulative bit curves. This combined curve does not then represent the actual number of bits that need to have been transmitted at times after the switch. Hence the actual delivery schedule is drawn with a step in it at the switching point, which is measured in terms of decoding time rather than delivery time.

Now suppose that at some particular time that $B_{1g}$ bits of the stream with quality q=1 have been delivered. If a switch to the stream with quality q=2 were now to be made, we could imagine that instead $B_{2g}$ bits have been delivered for the stream with quality q=2, and that the actual delivery schedule has been shifted upwards by $B_{2g} - B_{1g}$ bits at the last decoding time of the bits so far transmitted. Switching from the stream with quality q=1 to the stream with quality q=2 at this particular time is possible if the shifted delivery schedule is a valid delivery schedule for the stream with quality q=2. Instead of shifting the delivery schedule upwards by $B_{2g} - B_{1g}$ bits, we could equivalently imagine it to be shifted to the left by $(B_{2g} - B_{1g})/R$ group of pictures periods. This allows us to see easily that the shifted delivery schedule is valid provided that the left shift is at least equal to the start up delay required by the stream with quality q=2. And hence again we arrive at the constraint of Equation 19 on when switching is possible.

While the above examples have been described with reference to the receiver 200 performing the calculations that determine the required minimum bit rates and when to switch streams, the server could alternatively perform the same. The requirement is that the server would need to know the preload at the receiver's buffer in order to perform the required calculations.

Furthermore, while reference is made to determining the pre-calculated data at intervals of a GOP, and determining the minimum bit rate required at various GOP positions, the invention in certain exemplary embodiments can equally be based on any temporal position within the stream instead of GOP positions, such as some other suitable frame interval.

Exemplary embodiments of the invention are realized, at least in part, by executable computer program code which may be embodied in application program data provided for by the program modules at the server and receiver. When such computer program code is loaded into the memory of the server or receiver for execution by the respective processor, it provides a computer program code structure which is capable of performing at least part of the methods in accordance with the above described exemplary embodiments of the invention.

Furthermore, a person skilled in the art will appreciate that the computer program structure referred can correspond to the process flow charts shown in FIGS. 4, 7, 8 and 12 where each step of the flow chart can correspond to at least one line of computer program code and that such, in combination with the processor in the respective server or receiver, provides apparatus for effecting the described process.

In general, it is noted herein that while the above describes examples of the invention, there are several variations and modifications which may be made to the described examples without departing from the scope of the present invention as defined in the appended claims. For example, the invention could also be applied to the audio streams or other media streams instead of video. One skilled in the art will recognize modifications to the described examples.

The invention claimed is:

1. A method of transmitting a media sequence from a server to a receiver over a transmission link in a network, comprising:
   (a) encoding a media sequence at first and second quality levels to generate a respective first encoded sequence and second encoded sequence, wherein the first quality level is lower than the second quality level;
   (b) delivering the first encoded sequence to the receiver; and
   (c) determining a temporal position in the first encoded sequence at which to switch from transmission of the first encoded sequence to the second encoded sequence while ensuring timely delivery of the media sequence;
   wherein said temporal position is dependent on a position when the difference in cumulative bit counts between the second encoded sequence and the first encoded sequence is greater than the predicted throughput over the transmission link multiplied by the difference in a first preload and a second preload, wherein the first preload is the playout duration of data buffered at the receiver needed to deliver the second encoded sequence at the predicted throughput from the current temporal position, and the second preload is the playout duration of data presently buffered at the receiver.

2. The method according to claim 1, wherein if there is a plurality of positions, then the temporal position is determined as the first of such positions.

3. The method according to claim 1, further comprising:
   (d) switching from the first encoded sequence to the second encoded sequence when transmission of the first encoded sequence reaches the determined temporal position.

4. The method according to claim 1, wherein the media sequence is a video sequence.

5. The method according to claim 1, wherein the quality levels are fixed for each encoded sequence.

6. The method according to claim 1, wherein the quality levels are perceptual quality levels.

7. The method according to claim 1, wherein the receiver performs the determining.

8. The method according to claim 1, wherein the temporal position is a position of a group of pictures.

9. The method according to claim 1, wherein lower and upper predicted throughput values are used to determine respective later and earlier temporal positions, and further comprising deciding to switch from the first to the second encoded sequence based on the earlier and later temporal positions.

10. The method according to claim 1, wherein the predicted throughout is based on past throughput over the transmission link.

11. A method of streaming a media sequence from a server to a receiver over a transmission link in a network, comprising:
   (a) receiving, from the server at the receiver over the transmission link in the network, a first encoded sequence, said first encoded sequence representing a media sequence streamed and encoded at a first quality level; and
   (b) determining a temporal position in the first encoded sequence at which to switch from transmission of the first encoded sequence to a second encoded sequence while ensuring timely delivery of the sequence,
   wherein the second encoded sequence represents the media sequence encoded at a second quality level, said first quality level being lower than said second quality level; and
   wherein said temporal position is dependent on a position when the difference in cumulative bit counts between the second encoded sequence and the first encoded sequence is greater than the predicted throughput over the transmission link multiplied by the difference in a first preload and a second preload, wherein the first preload is the playout duration of data buffered at the receiver needed to deliver the second encoded sequence at the predicted throughput from the current temporal position, and the second preload is the playout duration of data presently buffered at the receiver.

12. The method according to claim 11, further comprising (c) switching from the first encoded sequence to the second encoded sequence when transmission of the first encoded sequence reaches the determined temporal position.

13. Apparatus for transmitting a media sequence from a server to a receiver over a transmission link in a network, comprising:
   a communication circuit;
   at least one processor and a memory operatively coupled thereto, the at least one processor being programmed to control the apparatus to at least:
      (a) encode a media sequence at first and second quality levels to generate a respective first encoded sequence and second encoded sequence, wherein the first quality level is lower than the second quality level;
      (b) deliver, in connection with the communication circuit, the first encoded sequence to the receiver; and
      (c) determine a temporal position in the first encoded sequence at which to switch from transmission of the first encoded sequence to the second encoded sequence while ensuring timely delivery of the media sequence;
   wherein said temporal position is dependent on a position when the difference in cumulative bit counts between the second encoded sequence and the first encoded sequence is greater than the predicted throughput over the transmission link multiplied by the difference in a first preload and a second preload, wherein the first preload is the playout duration of data buffered at the receiver needed to deliver the second encoded sequence at the predicted throughput from the current temporal position, and the second preload is the playout duration of data presently buffered at the receiver.

14. The apparatus according to claim 13, wherein if there is a plurality of positions, then the temporal position is determined as the first of such positions.

15. The apparatus according to claim 13, wherein the at least one processor is further programmed to control the apparatus to at least (d) switch from the first encoded sequence to the second encoded sequence when transmission of the first encoded sequence reaches the determined temporal position.

16. The apparatus according to claim 13, wherein the media sequence is a video sequence.

17. The apparatus according to claim 13, wherein the quality levels are fixed for each encoded sequence.

18. The apparatus according to claim 13, wherein the quality levels are perceptual quality levels.

19. The apparatus according to claim 13, wherein the receiver performs the determining.

20. The apparatus according to claim 13, wherein the temporal position is a position of a group of pictures.

21. The apparatus according to claim 13, wherein lower and upper predicted throughput values are used to determine respective later and earlier temporal positions, and wherein the at least one processor is further programmed to control the apparatus to at least decide to switch from the first to the second encoded sequence based on the earlier and later temporal positions.

22. The apparatus according to claim 13, wherein the predicted throughout is based on past throughput over the transmission link.

23. Apparatus for streaming a media sequence from a server to a receiver over a transmission link in a network, comprising:

a communication circuit;
at least one processor and a memory operatively coupled thereto, the at least one processor being programmed to control the apparatus to at least:
  (a) receive, from the server at the receiver over the transmission link in the network, a first encoded sequence, said first encoded sequence representing a media sequence streamed and encoded at a first quality level; and
  (b) determine a temporal position in the first encoded sequence at which to switch from transmission of the first encoded sequence to a second encoded sequence while ensuring timely delivery of the sequence,
wherein the second encoded sequence represents the media sequence encoded at a second quality level, said first quality level being lower than said second quality level; and
wherein said temporal position is dependent on a position when the difference in cumulative bit counts between the second encoded sequence and the first encoded sequence is greater than the predicted throughput over the transmission link multiplied by the difference in a first preload and a second preload, wherein the first preload is the playout duration of data buffered at the receiver needed to deliver the second encoded sequence at the predicted throughput from the current temporal position, and the second preload is the playout duration of data presently buffered at the receiver.

24. The apparatus according to claim 23, wherein the at least one processor is further programmed to control the apparatus to at least (c) switch from the first encoded sequence to the second encoded sequence when transmission of the first encoded sequence reaches the determined temporal position.

* * * * *